Aug. 25, 1931.   H. C. LE VINE   1,820,885
ELECTRIC TOASTER
Filed Sept. 17, 1928   2 Sheets-Sheet 1

Inventor
Harry C. LeVine
By Liverance and Van Antwerp
Attorneys

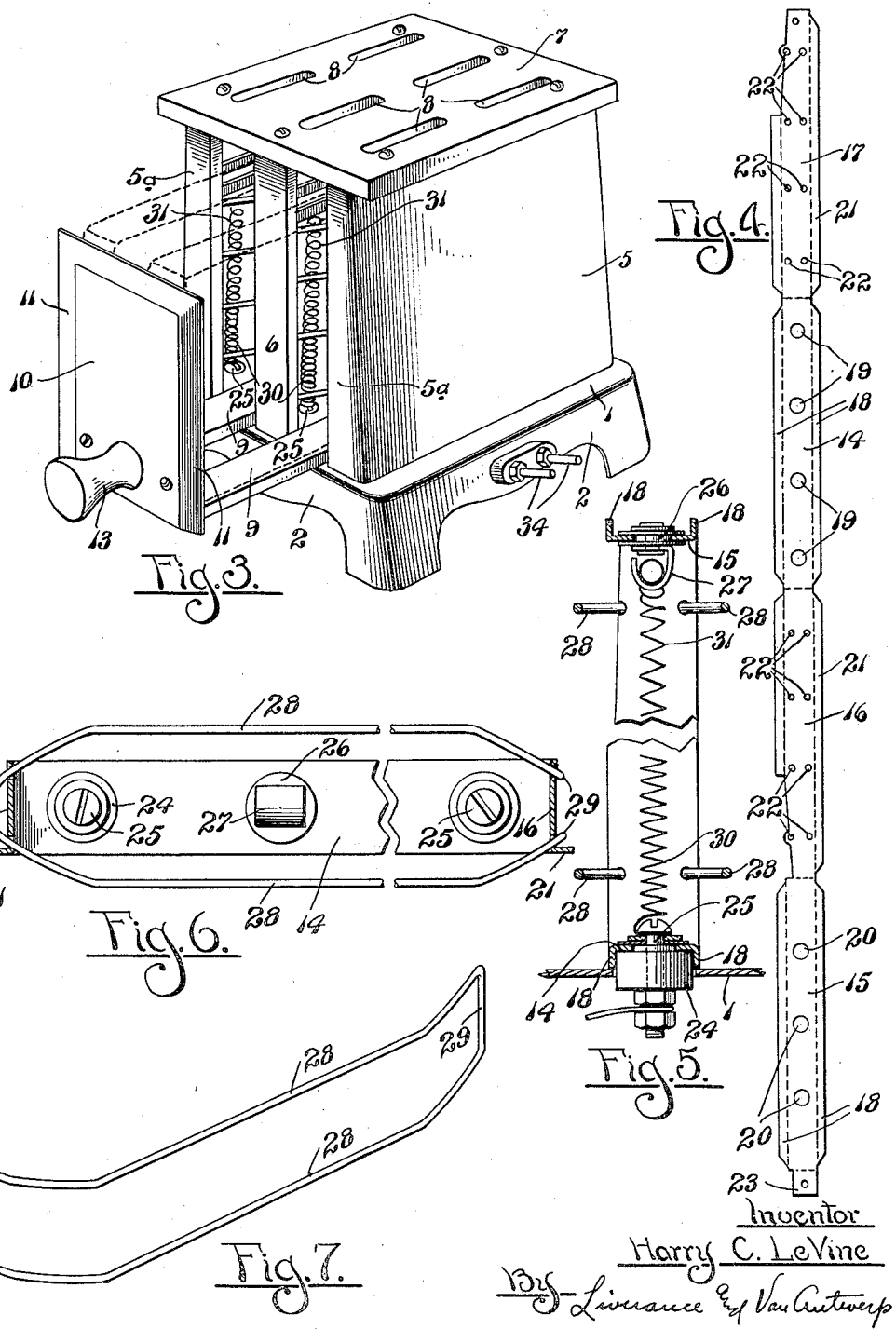

Patented Aug. 25, 1931

1,820,885

UNITED STATES PATENT OFFICE

HARRY C. LE VINE, OF GRAND RAPIDS, MICHIGAN

ELECTRIC TOASTER

Application filed September 17, 1928. Serial No. 306,528.

This invention relates to an electric toaster and is particularly concerned with many novel improvements in toasters of the character shown in United States Letters Patent No. 1,466,656 issued September 4, 1923 to C. E. Barr and Thomas E. Jackson. It is a primary object and purpose of the present invention to construct a toaster of the type shown in said letters patent but much more cheaply and economically, eliminating many expensive parts to manufacture and securing equally good or better results. The invention consists in many novel details of construction and arrangement of parts for effecting the end stated, particularly in the construction of the heating element, duplicated many times in the toaster, which is interchangeable for any of the places where it may be used therein and at the same time is capable of manufacture and assembly by use of labor having little or no skill whereby the manufacturing cost is greatly reduced.

For an understanding of the invention reference may be had to the following description taken in connection with the accompanying drawings, in which, Fig. 1 is a longitudinal vertical section through the toaster of my invention.

Fig. 3 is a perspective view of the toaster with the bread carrying rack partially withdrawn.

Fig. 4 is a plan view of the sheet metal blank from which the frame for the heating element is made.

Fig. 5 is a transverse vertical section through an assembled heating element.

Fig. 6 is a horizontal section through said heating element, and

Fig. 7 is a perspective view of one of the guard members, a number of which are used with each heating element.

Like reference characters refer to like parts in the different figures of the drawings.

Figure 2:
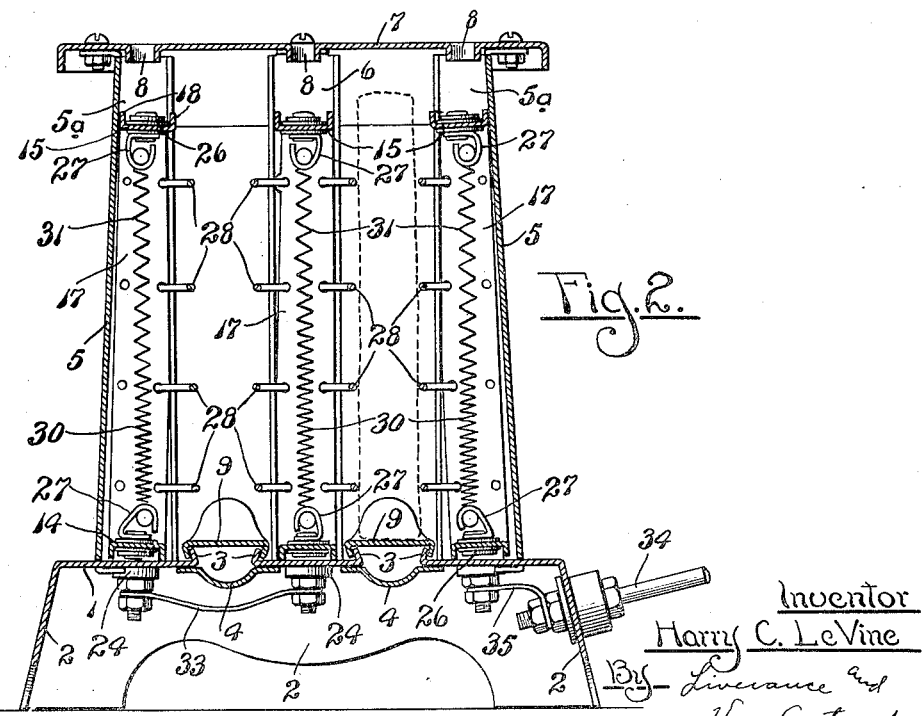
Fig. 2 is a transverse vertical section therethrough.

In the construction of the toaster, a sheet metal base 1 is provided having downwardly extending supporting side flanges and legs 2. The base 1 at a number of places in the width thereof has longitudinal slots, the metal at each side of each slot being turned upwardly at an angle, as indicated at 3, whereby a pair of guides is made at each side of each of the slots. At the underside of each slot, a crumb collecting trough 4 of sheet metal is permanently secured, as shown in Fig. 2.

Two side members 5 of sheet metal are located above the base 1 and secured thereto extending upwardly and inwardly at a slight angle to the vertical. Each side member at both its front and rear edges is turned inwardly to make a flange member 5a which, at its free edge, terminates in an inturned vertical flange. Midway between the two flange members 5a channel 6 is located at both the front and rear of the toaster, being permanently secured at its lower end to the base. Said channels likewise have inwardly extending vertical flanges similar to the inturned flanges made at the free edges of the members 5a.

The casing or housing of the electric toaster is completed by a cover or top 7 fastened at its upper ends to the sides 5 and the channel 6 and having a plurality of openings 8 therein for the escape of heated air as will hereinafter appear.

Figure 1:
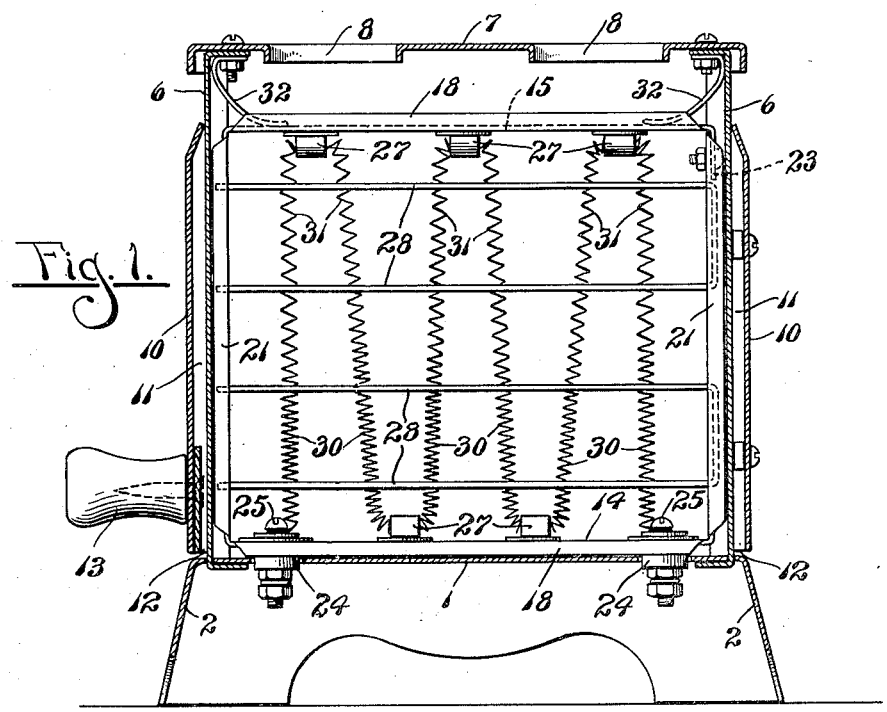

On the guides 3, which are located on the base 1 between the various inturned flanges of the channel 6 and the members 5a, slides 9 are mounted which are connected at their front ends by a door 10 of the shape indicated in Figs. 1 and 3, that is, having angularly disposed vertical edge portions 11 extending inwardly toward the housing of the toaster and a similar upper edge section, while the lower end is open providing an opening 12 for the entrance of air into the housing at the front lower portion thereof when the slides are within the toaster and the front closed by the door 10. Likewise, the rear side of the toaster is closed by a member 10 identical in structure with the door but permanently secured in place thereby providing a second opening 12 at the lower end of the housing for the entrance of air. It will be noted that the upper edges of the door and back do not extend to the top 7 of the housing but terminate a distance below the same, in practice one-half to three-quarters of an inch below. A knob 13 is fastened to the door 10. It is evident that by grasping it both slides 9 may be simultaneously moved in and out of the toaster housing. On each slide a slice of bread may be carried for introduction into or withdrawal from the housing.

Within the toaster housing a plurality of heating units are mounted one adjacent each side and located between the flanges of members 5a and the sides 5 and the others at the middle of the housing located between the flanges of channels 6. Each heating element is a duplicate of the other, all being made in the same manner.

In the construction of the heating element, an outer frame is provided made from a single length of sheet metal the blank of which is shown in Fig. 4. It includes a lower section 14, an upper section 15, one end section 16 connecting the upper and lower sections and another section 17 connected to the lower section 14 and adapted to be turned upwardly at right angles thereto. Each of the upper and lower sections 14 and 15 at its side edges is formed with outturned flanges 18 for strengthening and reinforcement. Four spaced apart openings 19 are cut through the lower section 14 of the frame and three spaced apart openings 20 through the upper section 15. This number of openings may be varied so long as there is one more in the base section than in the upper section. The end sections 16 and 17 at one side only are provided with an inturned flange such as indicated at 21, the other sides being cut away to the form shown, this for the purpose of allowing the frame which is made to be freely received between the flanges of members 5a and the sides of the case. The end sections at a plurality of points have openings 22 therethrough as shown. One of the sections of the blank in practice, the top 15, is provided with a tongue or ear 23 at its free end which overlaps the end of the section 17 at the other end of the blank for securing the ends of the blank together when the frame has been bent upward into rectangular form.

In the end openings 19 in the lower side 14 of each of the frames, a porcelain plug 24 is located having a larger part beneath extending between the flanges 18 of said base frame section and through an opening in the base 1 of the housing. A binding post 25 in the form of a bolt extends through the porcelain and above the base member 14 of the frame and is suitably insulated from the frame. In the remaining openings of the base member 14 and in all of the openings 20 of the upper member 15 of the frame, suitable insulating connectors 26 are secured to which hook members 27 are secured, the same extending upwardly from the base 14 and downwardly from the top member 15. The various pairs of openings 22 in the side members 16 and 17 of the frame serve as guides for guards made of wire having spaced apart parallel sides 28 connected at one end by cross member 29, bent so that when the sides 28 are passed through the openings 22 in the manner shown in Fig. 6, said guards are located outwardly a short distance beyond the sides of the frames of the heating elements. It is of course apparent that the middle heating element frame of the construction has guards at both sides while those at the sides of the construction have them only at the inner side, the other openings 22 through which guards are not passed not being used.

Heating coils are carried on the frames. Each coil at one end is connected with a binding post 25 extends upwardly over the first hook 27 thence extends back and forth between the upper and lower sides of the frame until the last hook 27 is reached thence having its other end connected to the other binding post 25. It will be noted, particularly with reference to Figs. 1 and 2, that the wires of the coils are spaced farther apart toward the upper side of each heating element and closer together at the lower side. The closer positioned coils are indicated at 30 and those wider positioned at 31. This insures that when the coils are heated by the passage of an electric current the greatest amount of heat is produced at the lower parts of the heating elements and less heat at the upper parts. This is very desirable and in fact is necessary in an electric toaster of this character inasmuch as the heat produced due to the circulation of air through the openings 12 and thence to the openings 7, causes some of the heat produced at the lower part of the toaster to become effective on the bread at the upper portion thereof. Uniformity in application of heat to the sides of the bread is secured by making the coils in the manner described. The frames are held between the channels 6 and between the end flange members 5 from endwise movement and are held against up and down movement by springs 32 (see Fig. 1) fastened to the housing and bearing against the upper sides 15 of each of the heating element frames at each end thereof. The various heating elements are connected in series by wires, such as 33 shown in Fig. 2, and one side 2 of the depending support for the base carries contacts 34 with which a plug may be connected, suitable connecting wires 35 leading from the plug contacts to the binding posts 25 at the opposite ends of the nearest adjacent heating element.

This construction has proved very practical particularly from a manufacturing standpoint and also from a standpoint of utility and service. The construction is very economical to manufacture. Many of the parts are duplicates and the assembly is simple and easy, not requiring any highly skilled labor in any part of the building and assembly of the device. By manufacturing the heating units as described with the wire coils located in parallel vertical planes with an upward circulation of air in the housing and with the production of the greatest amount of heat at the bottom portion of the housing, a perfect construction for the production of toast is provided and one wherein more than one slice of bread can be toasted uniformly on both sides at the same time. The invention is defined in the appended claims and is to be considered comprehensive of all forms of structure coming within their scope.

I claim:

1. In a toaster, a heating element comprising, a continuous length of sheet metal bent into rectangular form and having its ends connected, the upper and lower sides of the frame having spaced apart opening therethrough, a continuous coil of resistance wire located between the upper and lower sides of the frame, means secured in the end openings of the lower side of the frame to which the ends of said coil are permanently secured, and hooks secured at the openings in the upper side of the frame and the remaining openings in the lower side of the frame around which the coil is passed.

2. A toaster comprising, a base, a top, vertical sides between the base and top, a plurality of heating elements between said base and top, a back plate permanently secured to the toaster between the sides thereof and extending from the base nearly to the top, and a movable front plate for closing the opening between said sides of the toaster at the front thereof extending from said base to within a short distance of the top, whereby ventilating openings are provided at the ends near the top.

3. In a toaster, a heating element comprising a member bent into rectangular form and having its ends connected, each side of the rectangle having integral portions bent laterally therefrom whereby the respective side is strengthened, a continuous coil of resistance wire located within the frame and means secured to the frame and insulated therefrom for retaining said coil of resistance wire in place.

4. In a toaster, a heating element removable from the toaster and comprising, a frame, an electrical heating element located within the frame, and a guard comprising two bars integrally joined at one end by a cross member, said bars being attached to said frame by extending through openings in opposite sides of the frame.

5. In a toaster, a heating element removable from the toaster and comprising, a rectangular frame having outwardly opening channel shaped sides, an electrical heating element located within the frame, and a guard comprising two parallel bars joined at one end by a cross member and mounted on the frame by extending through openings at opposite sides thereof, the respective ends of the bars and the cross member lying within said channels of the frame.

In testimony whereof I affix my signature.

HARRY C. LE VINE.